(12) United States Patent
Masin

(10) Patent No.: US 11,461,610 B2
(45) Date of Patent: Oct. 4, 2022

(54) APPARATUS AND METHODS FOR RETROFITTING AN OBJECT WITH AN RFID TRANSPONDER

(71) Applicant: Trovan, Ltd., Isle of Man (GB)

(72) Inventor: Barbara Masin, Carpinteria, CA (US)

(73) Assignee: Trovan, Ltd., Isle of Man (GB)

( * ) Notice: Subject to any disclaimer, the term of this patent is extended or adjusted under 35 U.S.C. 154(b) by 60 days.

(21) Appl. No.: 17/005,990

(22) Filed: Aug. 28, 2020

(65) Prior Publication Data

US 2022/0067476 A1 Mar. 3, 2022

(51) Int. Cl.
*G06K 19/06* (2006.01)
*G06K 19/077* (2006.01)

(52) U.S. Cl.
CPC .............................. *G06K 19/07749* (2013.01)

(58) Field of Classification Search
CPC .......... G09F 3/0376; G06K 19/077798; G06K 19/07771; G06K 19/07758; G06K 19/07749; Y10T 29/49002; Y10T 20/49016; Y10T 156/1064
USPC .................................. 235/492, 462.46, 385
See application file for complete search history.

(56) References Cited

U.S. PATENT DOCUMENTS

| | | | |
|---|---|---|---|
| 4,746,556 A | 5/1988 | Matsuguchi et al. | |
| 5,867,102 A | 2/1999 | Souder et al. | |
| 6,043,746 A | 3/2000 | Sorrells | |
| 6,121,880 A | 9/2000 | Scott et al. | |
| 6,262,692 B1 | 7/2001 | Babb | |
| 6,421,013 B1 | 7/2002 | Chung | |
| 6,888,509 B2 | 5/2005 | Atherton | |
| 7,049,962 B2 | 5/2006 | Atherton et al. | |
| 7,095,324 B2 | 8/2006 | Conwell et al. | |
| 7,855,649 B2 | 12/2010 | Masin | |
| 8,120,497 B2* | 2/2012 | Binmore | G06K 19/07758 340/572.8 |
| 8,444,058 B2* | 5/2013 | Masin | G06K 19/07758 235/492 |
| 8,618,938 B2* | 12/2013 | Masin | F17C 13/003 340/572.8 |
| 9,394,785 B2* | 7/2016 | Goodwin | E21B 47/005 |
| 2005/0263602 A1 | 12/2005 | Lin et al. | |
| 2006/0202824 A1 | 9/2006 | Carroll et al. | |
| 2007/0029384 A1 | 2/2007 | Atherton | |

(Continued)

FOREIGN PATENT DOCUMENTS

| | | |
|---|---|---|
| EP | 1424651 | 6/2004 |
| WO | WO2016191794 | 12/2016 |

OTHER PUBLICATIONS

U.S. Appl. No. 16/430,956, filed Jun. 4, 2019, entitled "Systems and Methods to Secure Transponders Within RFID Tags Without Potting Elements," by Joseph V. Masin.

(Continued)

*Primary Examiner* — Daniel St. Cyr
(74) *Attorney, Agent, or Firm* — Trop, Pruner & Hu, P.C.

(57) ABSTRACT

In one embodiment, an assembly includes: a body having a generally cylindrical shape encompassing an internal cavity extending from a first end of the body towards a second end of the body; and a radio frequency identification (RFID) transponder positioned within the internal cavity. The assembly may be inserted into an opening made in an object in order to affix the RFID transponder to the object.

19 Claims, 2 Drawing Sheets

(56) References Cited

U.S. PATENT DOCUMENTS

| | | |
|---|---|---|
| 2007/0247317 A1 | 10/2007 | Farrell |
| 2008/0016005 A1 | 1/2008 | Owen et al. |
| 2009/0045963 A1 | 2/2009 | Vigneron et al. |
| 2009/0121877 A1 | 5/2009 | Henderson |
| 2011/0199228 A1* | 8/2011 | Roddy .................... E21B 47/01 340/856.4 |
| 2019/0146810 A1* | 5/2019 | Ganesh ............... H04L 43/0888 718/1 |

OTHER PUBLICATIONS

Hexagon Ragasco, "Technical Specification," Aug. 20, 2020, 2 pages total.
Hexagon Ragasco, "A Better Pattern for Your Business," Date Unknown, 12 pages total.
Hexagon Ragasco, "Frequently Asked Questions," Aug. 20, 2020, 3 pages total.
AMTROL-ALFA, "Comet—Innovation Is Long-Lasting," Date Unknown, 4 pages total.

* cited by examiner

APPARATUS AND METHODS FOR RETROFITTING AN OBJECT WITH AN RFID TRANSPONDER

BACKGROUND

RFID (radio frequency identification) tags are used to provide positive identification for and tracking of assets. RFID tags typically consist of an assembly including an RFID transponder coupled into a protective housing, and the tag assembly can then be used for asset management, container safety inspection verification, fraud prevention, ownership identification or other purposes. One application for such RFID tags, for example, is to ensure trackability and proper handling of containers containing hazardous products, such as liquid propane gas (LPG). However, one problem with existing RFID tags is that they can be removed from the container. Once removed, they can be applied to a different product or re-used. This removal and re-use causes a security risk that is undesirable. Another problem is that retrofitting certain types of containers with tags is difficult.

While RFID tags may be affixed to new LPG cylinders at a manufacturer location, oftentimes these RFID tags must be installed on existing cylinders in the field. As an example implementation, U.S. Pat. No. 7,855,649 discloses a process to affix an RFID tag to a metal LPG container with an adhesive. While this process may work well for metal containers, such retrofitting is difficult for other containers that have a plastic body or plastic top or handle. This is so, since the plastics used require long epoxy cure times (e.g., a number of days) to properly cure and attach the RFID tag to the plastic body. Furthermore, in this arrangement the RFID tag is readily visible and can be intentionally or unintentionally knocked off or removed from the LPG container.

SUMMARY OF INVENTION

Systems and methods are disclosed for RFID tags to be retrofitted to objects such as LPG containers. For disclosed embodiments, an RFID transponder is positioned in a cylindrically shaped body having an internal cavity extending from one end to the other. This assembly may be inserted into an opening made in an object in order to affix the RFID transponder to the object.

The cylindrically shaped body is generally tapered, and one end of the body may have a head with an annular ring that is wider than the remainder of the body. The annular ring may prevent the assembly from falling through the opening into an interior of, e.g., a handle or plastic jacket of the object. The assembly may further comprise an encapsulant material to affix the RFID transponder within the internal cavity, and a plurality of anchor structures extending from an external surface of the body to restrict removal of the assembly from the object in which it has been inserted. The plurality of anchor structures may extend radially from the external surface of the body, and may be wings.

In an example, the assembly may be inserted into an opening made in a handle or plastic jacket of a container used to store and transport LPG, beverages or chemicals. The method comprises: providing an opening in a predetermined surface of an object; inserting an assembly containing a RFID tag into the opening; and generating an entry in a database associating the RFID tag with the object.

In an example, the selected attachment area on the predetermined surface enables the RFID tag to be positioned in a predetermined orientation with respect to an RFID reader associated with an automated processing line. The object may be an LPG container and the predetermined surface comprises a top surface or handle of the LPG container. The method may further include reading the RFID tag with the RFID reader and accessing a database entry to obtain information regarding the object. The information regarding the object may be used in performing at least one operation on the object, such as obtaining the tare weight information of the LPG container and using that information to fill the LPG container. Providing the opening and inserting the tag assembly into it may occur at a field location to retrofit the LPG container with an RFID tag.

In yet another aspect, an assembly comprises: an object having a plastic portion, with an opening on a predetermined surface; and a tag assembly inserted at least partially through the opening. The tag assembly may include: a head portion larger than the opening to prevent the tag assembly from falling through the opening; a generally cylindrical portion extending from the head portion and defining an internal cavity that houses a RFID transponder; and a plurality of anchor structures to extend from an external surface of the generally cylindrical portion to restrict removal of the tag assembly from the object.

DETAILED DESCRIPTION

In various embodiments, an RFID transponder is positioned within a housing. In turn, this assembly is attached to the surface of an object to allow, e.g., asset tracking operations for the object using the RFID transponder.

More specifically, embodiments make provision for retrofitting of an RFID tag to an object at a field location. Embodiments herein are described in the context of an LPG container as the object, and more specifically such containers that have a plastic handle or plastic outer jacket, e.g., formed of high density polyethylene (HDPE) or other thermoplastic polymer, to which the RFID tag is to be attached. However embodiments are not limited in this regard and an embodiment housing a RFID tag may be affixed to other objects such as beverage kegs, chemical drums or tanks.

Figure 1:
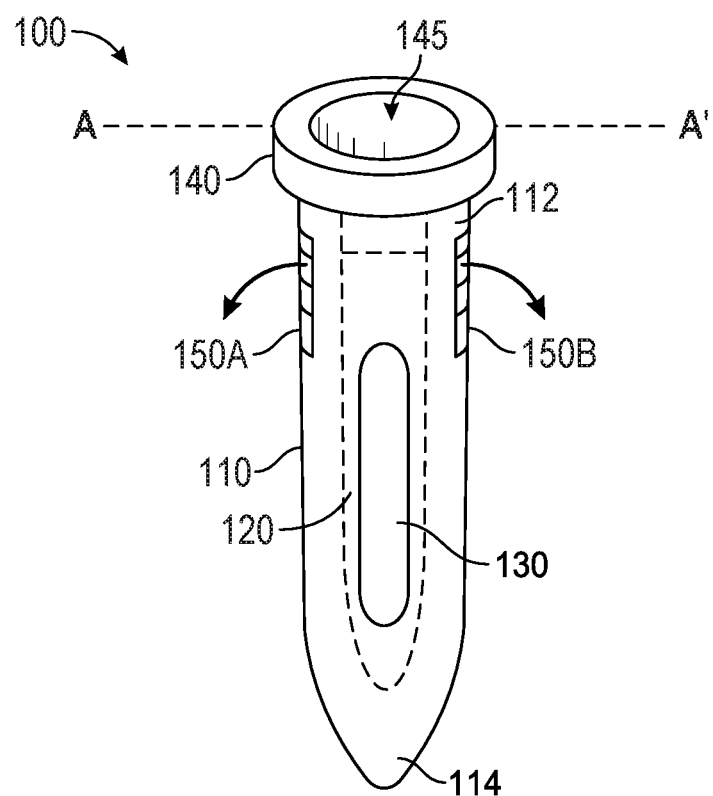
FIG. 1 is an illustration of a tag mounting device in accordance with an embodiment.

Referring now to FIG. 1, shown is a diagram of an embodiment, 100, that may generally take the form of a nail-like structure into which an RFID tag may be inserted. In turn, structure 100 may be inserted at least substantially within a plastic portion of an object to be tracked.

More specifically as shown in FIG. 1, structure 100 is formed of a body 110 that may be substantially cylindrical, with a tapering profile from a proximal or first end 112 to a distal or second end 114. In various embodiments, body 110 may be formed of a unitary plastic structure having a cavity 120 therein. An RFID tag 130 is positioned within cavity 120. The RFID tag 130 may be an encapsulated RFID transponder, which encapsulation may be made of glass. In an embodiment, the RFID transponder can have an antenna made of copper wire (e.g., 5-15 microns thickness) that is wound around a ferrite core and connected to an RFID integrated circuit. This connection can be made directly to conductive bumps on the RFID integrated circuit, through a compression bonding process, or via a substrate that may include additional components such as storage and/or tuning capacitors.

While not shown to scale in FIG. 1, cavity 120 may be sized to be substantially the width of RFID tag 130. For example, cavity 120 may provide a space having a width approximately 1 millimeter (mm) greater than the width of RFID tag 130. As such, a press fitting of RFID tag 130 within cavity 120 may permanently affix RFID tag 130 within structure 100. Optionally, an epoxy or other encapsulation material may be filled into cavity 120 after insertion of RFID tag 130 to further secure it.

Still with reference to FIG. 1, at first end 112 a head 140 is provided in the form of an annular ring, which may be used to ensure that structure 100 fits within an opening within an object, but does not fall into the object. Head 140 defines an opening 145 through which RFID tag 130 (and any encapsulant) is inserted.

As further shown in FIG. 1, anchor structures 150A, 150B may be provided on an exterior surface of body 110. While FIG. 1 shows an embodiment in which two anchor structures 150 are present, in other cases more or fewer anchor structures may be present. And in yet other embodiments these anchor structures may be optional.

Anchor structures 150 may be formed of the same plastic material as the rest of the body 110. Anchor structures 150 may expand as structure 100 is inserted into an opening where the structures are integral with the body 110, but have, e.g., vertical perforations to allow expansion. Further, anchor structures 150 may include ribbed protrusions or wings to restrict the ability of removing structure 100 from a seated position in an object. As such, when structure 100 is inserted into an object, anchor structures 150 may extend radially in the direction of the arrows shown in FIG. 1, such that they provide protection against removal of structure 100 from the object. While shown at this high level in the embodiment of FIG. 1, many variations and alternatives are possible.

Figure 2:
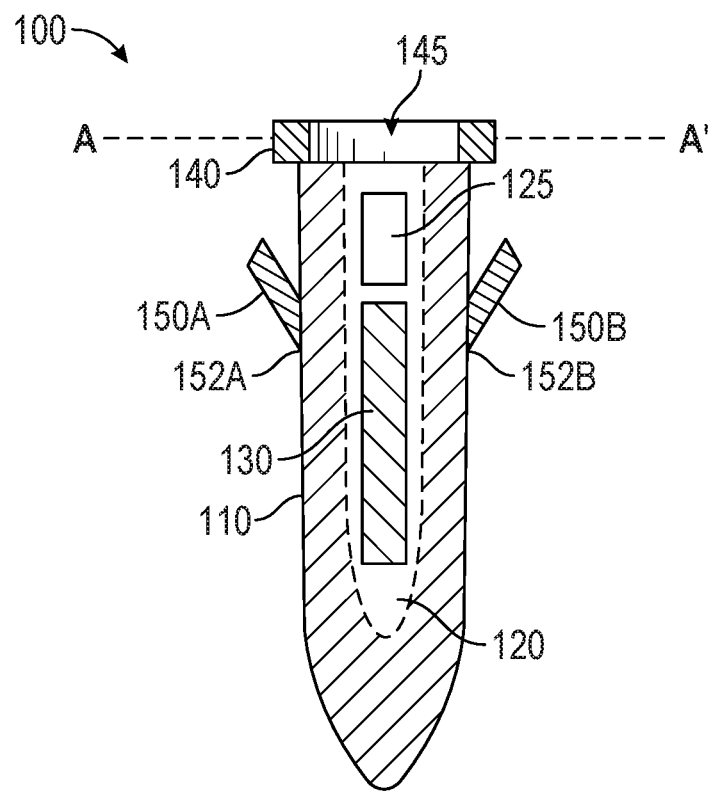
FIG. 2 is a cross-section view along line A-A' of FIG. 1.

Referring now to FIG. 2, shown is a cross-section view along line A-A' of FIG. 1. More specifically, FIG. 2 illustrates an arrangement of structure 100 as it may be inserted within an object, such that anchor structures 150A, 150B are radially extended to provide protection against removal. In some cases, anchor structures 150 may be separate components attached to structure 100. As shown in FIG. 2, anchor structures 150 are only attached to a remainder of the exterior surface of body 100 by joining members 152A, 152B. In other cases, additional joining members may be adapted on a top portion of anchor structures 150, to allow wedge-like protrusion of anchor structures 150 upon insertion into an object. While in some cases these alternate anchor structures 150 may be formed of the same plastic material, in other cases they may be formed of a metal or other more resilient material.

The cross-section, FIG. 2, shows an encapsulant material 125, that further protects structure 100 and its included RFID tag 130 from removal. In other aspects, the cross-sectional view in FIG. 2 is the same as structure 100 in FIG. 1.

Figure 3:
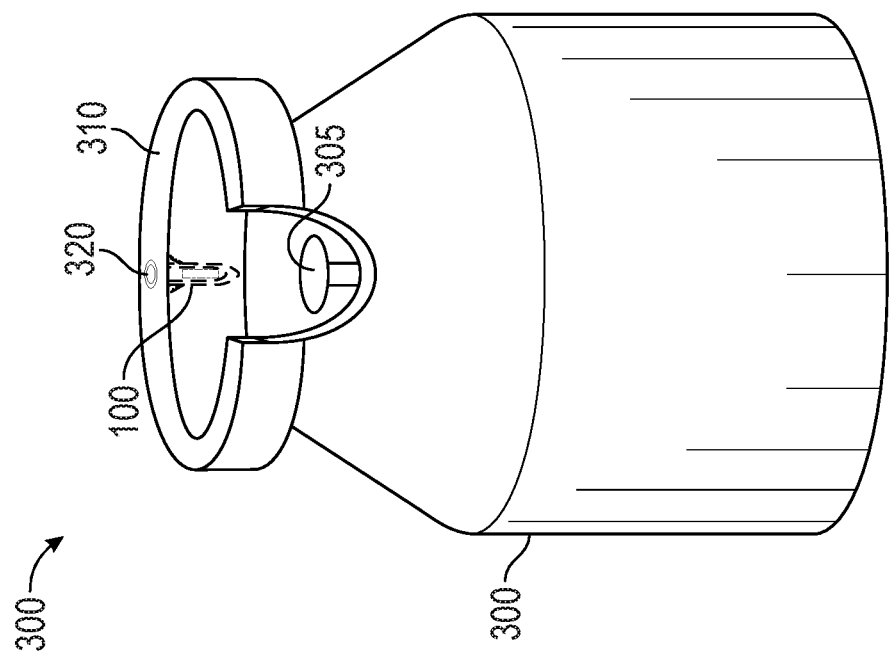
FIG. 3 is an illustration of an object including a tag assembly in accordance with an embodiment.

FIG. 3, shows an object fitted with a tag assembly in accordance with an embodiment. As shown in FIG. 3, object 300 is an LPG cylinder that has a plastic handle portion 310. In some implementations, object 300 may be a composite LPG container, or a steel LPG container, and only the outer jacket or handle may be made of HDPE or similar plastic material. This outer jacket may incorporate, but does not have to incorporate, a handle. Object 300 further may include a valve 305, which is used to start and stop a flow of gas or liquid from the container.

As shown, an opening 320 is provided within a top portion of the container jacket or handle 310. For purposes of performing a retrofit operation, a user may drill a hole to form opening 320. In one embodiment, opening 320 may be circular (or at least substantially circular) and may have a diameter of between approximately 1 mm and 10 mm, as an example. As further shown in phantom view in FIG. 3, a structure 100 is affixed within handle 310. Note that anchor structures may be engaged to restrict removal of structure 100. Further, a head portion of structure 100 prevents it from falling into a chamber or cavity of handle 310.

Thus a vertical alignment of the RFID tag within structure 100 is effected by providing opening 320 on a horizontal surface of handle 310. This arrangement may provide for optimal positioning of the RFID tag to be read by an automated RFID tag reader positioned with respect to a manufacturing line or filling operation through which the container passes. Of course, RFID tags may be positioned differently in other use cases.

Figure 4:
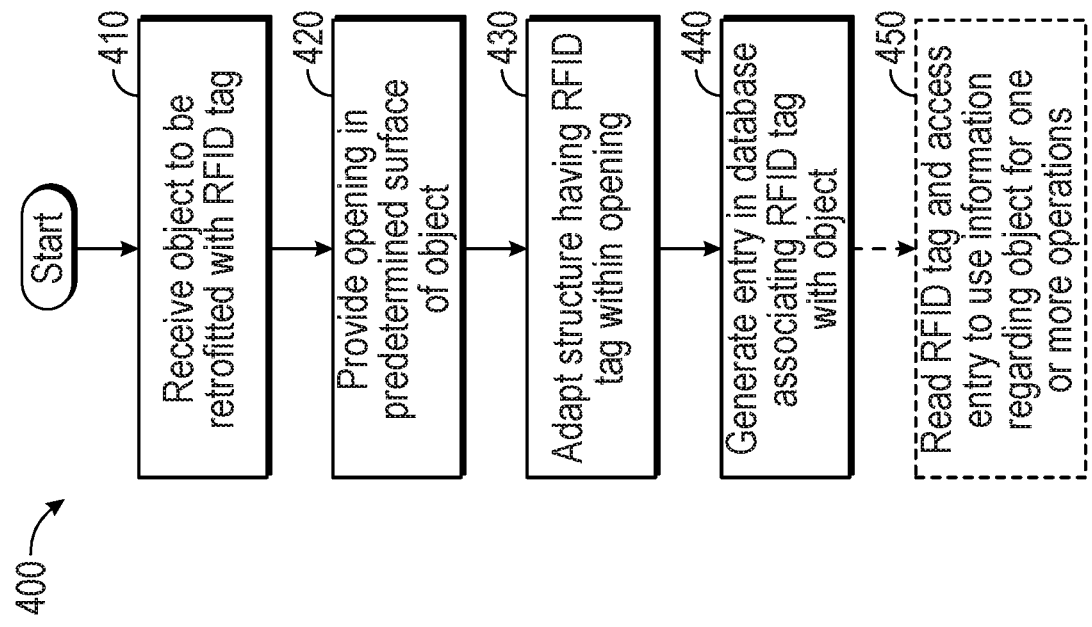
FIG. 4 is a flow diagram of a method in accordance with an embodiment.

FIG. 4, shows a flow diagram of a method in accordance with an embodiment. As shown in FIG. 4, method 400 is a method for retrofitting an object, such as an LPG container, with a RFID tag protected by and enclosed within a structure as described herein. As examples, such retrofitting operations can be performed to attach RFID tags enclosed in such structures within LPG containers at a given LPG handling facility or other such location.

Method 400 begins with receipt of an object to be retrofitted with an RFID tag (block 410). As an example, a filling plant may receive an LPG container which does not yet have an RFID tag. Next at block 420 an opening is made on a predetermined surface of the object. In an example embodiment, the opening is made in the top-most surface of the container, which in this instance is a handle. For example, a user may drill a hole through this top surface to provide the opening.

Next, at block 430 a structure containing an RFID tag may be inserted into the opening. This structure may take the form described in FIG. 1, as an example. In this way, the RFID tag may be placed in a substantially vertical alignment, which may be optimal positioning for being read by an RFID reader.

As a result of attaching the RFID tag to the LPG container via this retrofit operation, certain automated operations may be enabled, with respect to asset tracking, filling and maintenance operations and so forth. To enable these operations, an entry in a database may be generated that associates the RFID tag with the object, 440. As an example, this entry may include at least the ID number of the RFID tag and may also include information about the object. This ID number may be a globally unique identifier (GUID). In the context of an LPG container, included information may include container type, size, tare weight, date of manufacture, next inspection date and so forth. Note that in some cases this entry already may be present for the object and can simply be updated to include an identifier of the RFID tag. In other cases, a new entry may be made in the database.

Still with reference to FIG. 4, an optional step 450 is shown that describes one example use case for the RFID tag. As shown in FIG. 4, block 450 may be performed during, e.g., a fill operation in which the LPG container is present on an automated fill line, along with many other containers. As the containers proceed along this line, an RFID reader may read the RFID tag and communicate at least the GUID to a computing system such as a server system of the line, which in turn accesses an entry within the database using this RFID tag value.

Information from the entry regarding the object can be used for one or more operations. In the context of a fill, information including the tare weight and size class of the LPG container can be used to enable more rapid and safer fill operations to be performed. As an example, these values can be automatically loaded into a fill assembly, avoiding operator error. Then the fill assembly can fill the LPG container to the appropriate level, given the tare weight and container size. Of course this is one example. In other cases, information in a database entry associated with an RFID tag can be used to identify when a given container is to have a maintenance cycle performed, a re-certification or so forth. While shown at this high level in the embodiment of FIG. 4, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An assembly comprising:
a body having a generally cylindrical shape encompassing an internal cavity extending from a first end of the body towards a second end of the body;
a radio frequency identification (RFID) transponder positioned within the internal cavity, wherein the assembly is to be inserted into an opening made in an object in order to affix the RFID transponder to the object; and
a plurality of anchor structures extending from an external surface of the body, wherein the plurality of anchor structures are configured to expand when the assembly is inserted into the object, to restrict removal of the assembly from the object.

2. The assembly of claim 1, wherein the first end has an opening through which the RFID transponder is inserted into the internal cavity.

3. The assembly of claim 2, wherein the first end comprises a head having an annular ring, the annular ring wider than a remainder of the body to prevent the assembly from falling into the object, wherein the generally cylindrical shape is tapered from the first end to the second end.

4. The assembly of claim 1, wherein the assembly is to be inserted into the opening in a handle or plastic jacket of the object, the object comprising a plastic container or a container with the handle or plastic jacket, used to store and transport LPG, beverages or chemicals.

5. The assembly of claim 4, further comprising a LPG container, wherein the LPG container is retrofitted with the opening.

6. The apparatus of claim 1, further comprising an encapsulant material to affix the RFID transponder within the internal cavity.

7. The assembly of claim 1, wherein the plurality of anchor structures extend radially from the external surface of the body.

8. The assembly of claim 7, wherein the plurality of anchor structures comprises wings.

9. The assembly of claim 1, wherein the RFID transponder is press fit into the internal cavity.

10. A method comprising:
providing an opening in a predetermined surface of an object;
inserting an assembly having a radio frequency identification (RFID) tag within the opening, the assembly comprising a body having a generally cylindrical shape tapering from a proximal end to a distal end and defining an internal cavity in which the RFID tag is inserted, the assembly further having a plurality of anchor structures to extend from an external surface of the body to restrict removal of the assembly from the object; and
generating an entry in a database associating the RFID tag with the object.

11. The method of claim 10, wherein the predetermined surface enables the RFID tag to be positioned in a predetermined orientation with respect to an RFID reader associated with an automated processing line.

12. The method of claim 11, further comprising reading the RFID tag with the RFID reader and accessing the entry to obtain information regarding the object.

13. The method of claim 12, further comprising using the information regarding the object in performing at least one operation on the object.

14. The method of claim 10, wherein the object comprises an LPG container and the predetermined surface comprises a top surface or handle of the LPG container, the method further comprising accessing the entry to obtain tare weight information regarding the LPG container and using the tare weight information to fill the LPG container.

15. The method of claim 14, further comprising providing the opening and adapting the structure within the opening at a field location to retrofit the LPG container with the RFID tag.

16. An assembly comprising:
an object having a plastic portion, the plastic portion having a first surface with an opening; and
a tag assembly inserted at least partially through the opening, the tag assembly comprising:
a head portion larger than the opening to prevent the tag assembly from falling through the opening;
a generally cylindrical portion extending from the head portion and defining an internal cavity that houses a radio frequency identification (RFID) transponder; and
a plurality of anchor structures to extend from an external surface of the generally cylindrical portion to restrict removal of the tag assembly from the object.

17. The assembly of claim 16, wherein the tag assembly is to be retrofitted to the object at a field location, the object comprising an LPG container and the first surface comprising a top surface or a handle of the LPG container.

18. The assembly of claim 16, further comprising an encapsulant material to affix the RFID transponder within the internal cavity.

19. The assembly of claim 16, wherein the plurality of anchor structures comprises wings, the wings extending radially from the external surface to restrict the removal of the tag assembly.

* * * * *